Sept. 27, 1949.                I. F. WEISS                    2,482,954
                      ELECTRIC MOTOR BRAKING CONTROL
Filed Sept. 20, 1947                                  2 Sheets-Sheet 1

INVENTOR.
IRVING F. WEISS
BY
Kwis, Hudson, Boughton & Williams
ATTORNEYS

Sept. 27, 1949.  I. F. WEISS  2,482,954
ELECTRIC MOTOR BRAKING CONTROL
Filed Sept. 20, 1947  2 Sheets-Sheet 2

INVENTOR.
Irving F. Weiss
BY
Kwis, Hudson, Boughton & Williams
ATTORNEYS

Patented Sept. 27, 1949

2,482,954

UNITED STATES PATENT OFFICE 2,482,954

ELECTRIC MOTOR BRAKING CONTROL

Irving F. Weiss, Cleveland, Ohio, assignor to The Warner & Swasey Company, Cleveland, Ohio, a corporation of Ohio Application September 20, 1947, Serial No. 775,270

5 Claims. (Cl. 318—275)

This invention relates to a machine tool and more particularly to means for stopping the work spindle of the machine tool in a predetermined position.

The principal object of the invention is to provide in a machine tool means for stopping the work spindle in a predetermined position to thus facilitate the loading and unloading of the work pieces held by the work spindle during the machining operation.

Another object is to provide in a machine tool means for stopping the work spindle in a predetermined position and which means is positive, acurate and efficient in operation.

A further object is to provide in a machine tool means for stopping the work spindle in a predetermined position and which means normally during the operation of the machine is so located that the operative parts thereof are idle and withdrawn and hence do not produce noise and are not subject to wear but which means may selectively be caused to momentarily move into operative location to stop the spindle.

A further object is to provide in a machine tool in combination with the electrical control for the spindle drive motor means which can be selectively set by the operator to effect automatically upon the deenergization of the drive motor a stopping of the work spindle in a predetermined position.

A further object is to provide in a machine tool as specified in the last named object, means for stopping the work spindle in a predetermined position and which means includes provision for first decelerating the rotation of the spindle and then applying momentarily an abnormally heavy braking action to the rotation of the spindle followed by the application of a normal braking action thereto to bring the spindle to a positive stop in a predetermined position.

A further object of the invention is to provide in a machine tool having a work spindle and an electric drive motor therefor together with control means for said motor, braking means including an electromagnetic brake and provisions for controlling the energization thereof automatically upon the deenergization of the drive motor and such that said electromagnetic brake first applies momentarily an abnormally heavy braking action to the work spindle to quickly overcome the angular momentum thereof and thereafter applies a normal braking action thereto as long as the electromagnetic brake is energized.

Further and additional objects and advantages not hereinbefore referred to will become apparent hereinafter during the detailed description of an embodiment of the invention which is to follow and which embodiment is illustrated in the accompanying drawings wherein Fig. 1 is a front elevational view of a turret lathe to which the invention has been applied.

Figure 1:
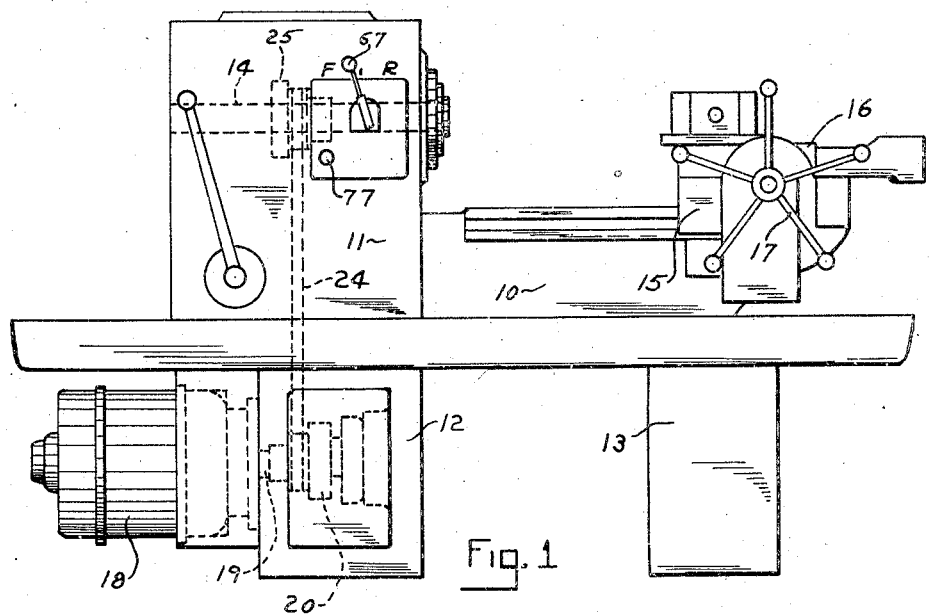

The machine tool shown in Fig. 1 is for purposes of illustration a turret lathe and comprises a bed 10 at one end of which is the headstock 11. The bed and headstock are supported on legs 12 and 13. The headstock rotatably mounts a work spindle 14 while the bed 10 is provided on its upper side with ways parallel to the work spindle and on which a base 15 can be adjustably moved and clamped in position. The base 15 on its upper side is provided with ways on which moves a turret slide 16. In the illustration the turret slide is shown as being manually movable by means of a turnstile 17 all as is well understood in the art. The work spindle 14 is driven in opposite directions by a main drive motor 18 which is indicated as a reversible three-phase induction motor. The motor 18 is supported beneath the bed 10 on the exterior of the leg 12 and its shaft 19 extends into the interior of the leg.

The motor shaft 19 mounts a drive pulley 20 which is illustrated as a three-step pulley. This pulley is mounted on a conical sleeve 21 which is fixed to the shaft 19 and said pulley is held in position on the sleeve by means of a securing disk 22 held in tight contacting engagement with the bottom of a counterbore formed in the outer end of the pulley concentrically to the shaft 19. A suitable securing screw 23 extends through the disk 22 and is screwed into the tapped hole in the end of the shaft 19 and acts to firmly hold the disk and pulley in assembled position with respect to the shaft 19 and sleeve 21. A belt 24 extending around the pulley 20 passes upwardly within the headstock and around a driven three-step pulley 25 fixed to the spindle 14.

An electromagnetic brake is located in the leg 12 and functions to brake the rotation of the motor shaft 19 when the motor is deenergized, the work spindle drive and the rotation of the work spindle 14. This brake comprises a coil support 26 stationarily mounted on a portion 27 of the internal structure of the leg 12. The coil support 26 is provided with an annular recess in which is mounted the coil 28. When the coil is energized its magnetic pull acts on the armature plate 29 to create a predetermined frictional contact between said plate and the adjacent end surface of the coil support 26 or, if desired, between the plate and a suitable wear ring mounted on said adjacent end of the coil support. The armature plate 29 is mounted to rotate with the disk 22 and the shaft 19 by means of a plurality of threaded studs 30 spaced circularly of and carried by the disk 22 and extending through openings formed in the armature plate 29, such openings being slightly larger than the external diameter of the studs. The disk 22 is also provided with a plurality of recesses 31 which are circularly spaced around the block and open toward the armature plate 29. The recesses 31 mount coil expansion springs 32 which engage the adjacent side of the armature plate 29 and act to normally hold said plate in light frictional engagement with the adjacent end of the coil support 26, it being understood that this slight frictional engagement is of such character that it has negligible effect on the rotation of the armature plate 29 and the motor shaft 19 relative to the coil support 26. In other words, in the electromagnetic brake disclosed there is no air gap between the armature plate and the coil support at any time.

Figure 2:
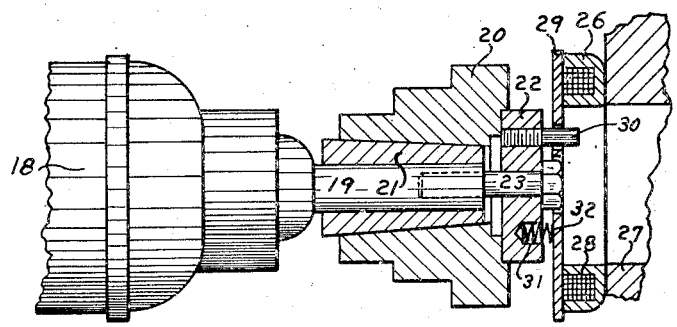
Fig. 2 is a fragmentary detached view on a larger scale showing in elevation the drive motor for the work spindle and in section the drive pulley on the motor shaft together with a sectional illustration of the electromagnetic brake.

The plane of the section of Fig. 2 shows only one stud 30 and one recess 31, but it will be understood that there are a plurality of such studs and such recesses and as an example the studs and recesses each may be three in number with the three studs and the three recesses arranged circularly in alternating relationship.

It will later be pointed out that whenever the motor 18 is deenergized the electromagnetic brake will be applied first momentarily with an abnormally heavy braking action and thereafter with a normal braking action.

Figure 5:
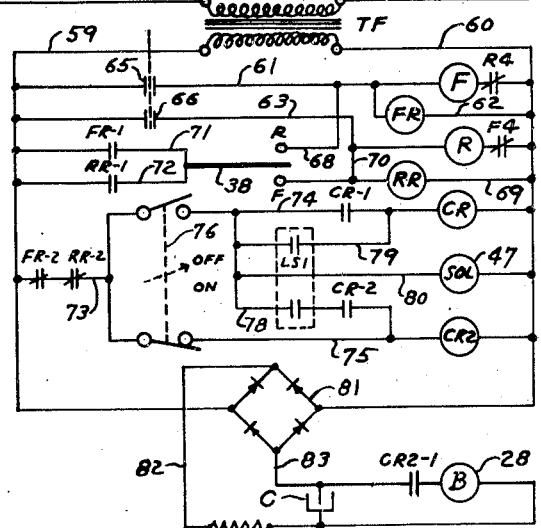
Fig. 5 is a wiring diagram of the control circuits for the spindle drive motor, the spindle positioning means and the electromagnetic brake.

In order to stop the rotation of the spindle in a predetermined position to facilitate the loading and unloading of work pieces means is provided in the headstock to this end and said means will now be described. The work spindle 14 has fixed thereto a gear 33, see Fig. 3, and said gear constantly is in mesh with a similar gear 34 fixed on a shaft 35 rotatably mounted in the headstock in parallel relationship to the work spindle. It will thus be seen that the shaft 35 is driven by the work spindle with a one-to-one ratio. A conventional plugging switch 36 is secured to an internal supporting portion 37 of the headstock and the shaft 35 extends through said plugging switch and is operatively connected to the movable contact arm 38 thereof and said arm as is well understood in the art is moved by centrifugal force when the shaft 35 is rotating above a predetermined speed into contact with either the forward contact R or the reverse contact F of the plugging switch (see Fig. 5). It will also be understood that when the rotation of the shaft 35 falls below the predetermined speed the centrifugal force acting on the contact arm 38 of the plugging switch will be insufficient to maintain said arm in engagement with either of the contacts of the switch above referred to and said arm will move toward a central or inactive position.

Figure 3:
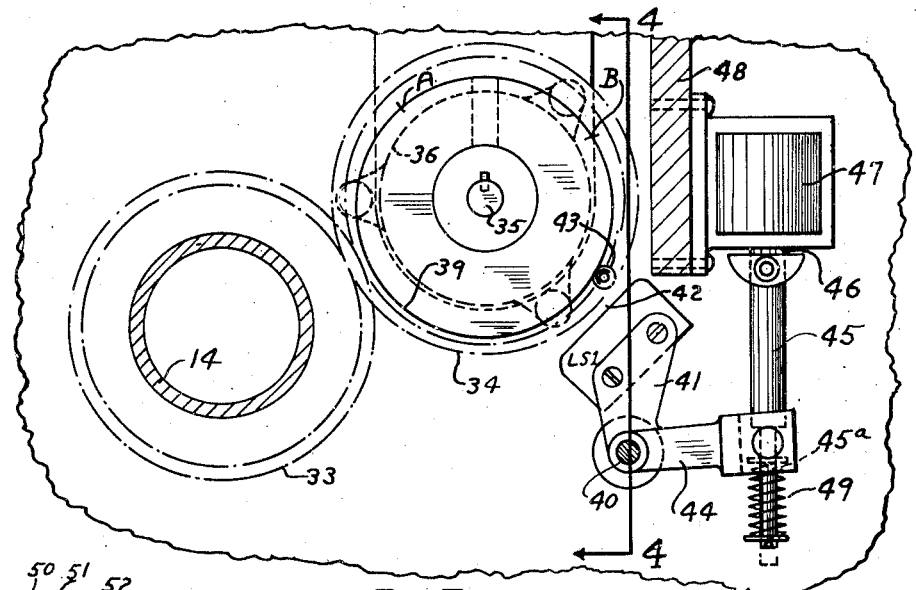
Fig. 3 is a transverse vertical sectional view through the headstock, the work spindle being shown in section and the mechanical elements of the spindle positioning means being shown in elevation.
Figure 4:
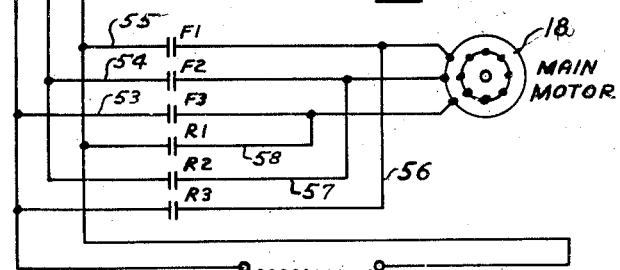
Fig. 4 is a sectional view taken substantially on line 4—4 of Fig. 3.
Figure 4:
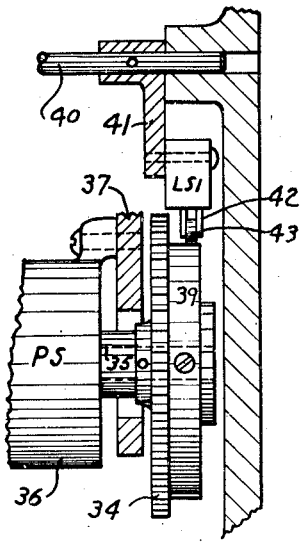

The shaft 35 adjacent to the gear 34 has fixed thereto a cam 39, the periphery of which is provided with a low arcuate portion lying between the points A and B as indicated in Fig. 3 when considered in a clockwise direction. The remainder of the periphery of the cam 39 constitutes the high portion of the cam.

The headstock has mounted therein a rockable rod 40 which extends parallel to the spindle 14 and the shaft 35. The rod 40 has fixed thereto a bell crank lever or bracket the arm 41 of which has secured to it a limit switch LS1 which includes a spring pressed switch actuating arm 42 provided with a forked portion mounting a roller 43 which when the bell crank lever arm is rocked in one direction will be so positioned as not to engage with the circumference of the cam 39 and when rocked in the other direction will be in contact with said circumference so that the high portion thereof will act to rock the actuating arm 42 to actuate said limit switch.

The limit switch LS1 is a double contact switch consisting of a normally open contact and a normally closed contact. The other arm 44 of the bell crank lever on the rod 40 is provided at its free end with a forked portion which straddles a reduced extension of the bar 45 and a washer 45a on said extension forms with the shoulder of the bar a groove receiving rollers carried by the forked portion of the arm 44. It will be seen that linear movement of the bar 45 acts to rock the bell crank on the rod 40. The bar 45 at its upper end is pivotally connected to the armature 46 of a solenoid 47 that is secured to an internal portion 48 of the headstock. The bar 45 is maintained normally by a spring (not shown) in the solenoid 47 in a lowered position, at which time the bell crank lever on the rod 40 has been rocked in a clockwise direction so that the roller 43 of the actuating arm 42 of limit switch LS1 is out of contact with the periphery of the cam 39. This is the condition that prevails when the solenoid 47 is deenergized. A spring 49 carried on the reduced end of bar 45 between washer 45a and a fixed lower washer cushions the movement of the bell crank arm under the action of the solenoid 47. However upon said solenoid being energized and its core 46 moved upwardly (as shown in Fig. 3) the bar 45 will be correspondingly raised and said bell crank lever on the rod 40 will be rocked in a counterclockwise direction to bring the roller 43 into a position where it will contact with the periphery of the cam 39 and as soon as the roller engages with the high portion of the cam the actuating arm 42 of said switch will be moved and the switch will be actuated to effect closing of its normally open contact and opening of its normally closed contact.

Electric power for the main motor 18 is supplied by a three-phase power line consisting of the wires 50, 51 and 52. It will be understood that a main switch, not shown, is provided for opening or closing the power line. The wires 50, 51 and 52 are connected, respectively to the motor 18 by wires 53, 54 and 55 with said latter wires containing, respectively, contacts F3, F2 and F1 of the forward contactor. The wire 50 is connected by wire 56 to wire 55 intermediate contact F1 and motor 18. The wire 51 is connected by wire 57 to wire 54 intermediate contact F2 and the motor 18. The wire 52 is connected by wire 58 to wire 53 intermediate contact F3 and the motor 18. The wires 56, 57 and 58 contact respectively contacts R3, R2 and R1 of the reverse contactor. It will be understood that the motor 18 may be energized for either forward or reverse operation depending upon whether the contacts F1, F2 and F3 are closed or the contacts R1, R2 and R3 are closed.

The wires 50 and 52 extend to and are connected with the opposite ends of the primary of a transformer TF. The opposite ends of the secondary of said transformer are connected to wires 59 and 60 of the A. C. control circuit for the motor 18. The wires 59 and 60 are interconnected by a wire 61 containing the coil F of the forward contactor and also containing the normally closed contact R4 of the reverse contactor. The wire 61 is connected to wire 60 around coil F and contact R4 by wire 62 containing relay FR. The wires 59 and 60 are interconnected by wire 63 containing coil R of the reverse contactor and normally closed contact F4.

The wires 61 and 63 contain, respectively, the forward switch 65 and the reverse switch 66 and said switches may be mechanically interlocked to be actuated by a rockable lever 67 mounted on the front of the headstock and which when moved to position F for forward operation of the machine closes the contact of switch 65 or when moved to position R for reverse operation of the machine closes the contacts of switch 66 or when moved to an intermediate position effects opening of the contacts of both switches 65 and 66 to cause a deenergization of the motor 18 and a resultant stopping of the spindle.

The reverse contact R of plugging switch 36 is connected by wire 68 to wire 61 intermediate switch 65 and the connection of wire 62 to the wire 61. The forward contact F of the plugging switch 36 is connected by wire 69 to wire 60 with said wire 69 containing relay RR. The wire 69 intermediate contact F of the plugging switch and relay RR is connected by a wire 70 to wire 63 intermediate switch 66 and coil R. The movable contact arm 38 of the plugging switch 36 is connected by wires 71 and 72 to wire 59 with said wires 71 and 72 containing, respectively, normally open contacts FR—1 and RR—1. The wire 59 is connected by a wire 73 containing normally closed contacts FR—2 and RR—2 with wires 74 and 75 which in turn are connected to wire 60. The wires 74 and 75 contain respectively the contacts of a positioning switch 76 which is actuated by a control knob 77 located on the front of the headstock and movable to either an "off" position wherein the contacts of the switch in wire 74 are open and the contacts thereof in wire 75 are closed or to an "on" position wherein the contacts of the switch in wire 74 are closed and the contacts thereof in wire 75 are open. The wire 74 contains relay CR and normally open contact CR1 while the wire 75 contains relay CR2. The wires 74 and 75 are interconnected by a wire 78 with said wire connected to the wire 74 intermediate the contacts of positioning switch 76 and normally open contact CR1 and to wire 75 intermediate the contacts of positioning switch 76 and relay CR—2. The wire 78 contains the normally closed contacts of limit switch LS1 and normally open contact CR—2. The wire 78 is connected by wire 79 to wire 74 intermediate normally open contacts CR—1 and relay CR and said wire 79 contains the normally open contacts of limit switch LS1. The wire 78 is connected to wire 60 by a wire 80 containing solenoid 47.

The wires 59 and 60 extend to and are connected with the input side of a bridge rectifier 81 from the output side of which extend the wires 82 and 83 of a D. C. circuit for the electromagnetic brake. The wire 83 contains normally open contacts CR2—1 and the coil 28 of the electromagnetic brake. A resistance R is in the wire 82 while a condenser C is connected across the D. C. brake circuit (wires 82 and 83) with the condenser located intermediate the resistance R and normally open contacts CR2—1. The coil 28 of the electromagnetic brake is of a selected rated voltage while the voltage of the D. C. circuit is several times said rated voltage. The resistance R is so chosen as to normally provide the rated voltage for the coil 28 when the contacts CR2—1 are closed. However when said contacts are open the condenser C will be charged to full line voltage which, as stated, is several times the rated voltage of the coil 28. Then when contacts CR2—1 are closed the condenser will discharge and apply to the coil 28 an abnormally high voltage causing the coil to exert an abnormally heavy magnetic pull on the armature plate 29 and thus to create an abnormally greater braking action on the rotation of the motor 18 and spindle 14. This causes the condenser to discharge, whereupon the resistor R acts to apply the rated voltage to the coil 28 and thus said coil after having momentarily exerted an abnormally heavy magnetic pull to effect a momentary abnormally greater braking action continues as long as contacts CR2—1 are closed to exert a normal magnetic pull and braking action. The operation of the mechanism hereinbefore described will now be set forth.

It will be assumed that the lever 67 is in intermediate or "off" position, that a workpiece is mounted in the chuck of the work spindle 14, and that the main switch (not shown) in the power line 50, 51 and 52 is closed so that control and brake circuits are energized. The operator desiring to start forward rotation of the work spindle moves the lever 67 into forward position F. This closes the contacts of forward switch 65 in wire 61, the contacts of reverse switch 66 in wire 63 remaining open. Therefore forward contactor coil F in wire 61 is energized as is also relay FR in wire 62. At this time reverse contactor coil R in wire 63 is not energized and normally closed contacts F4 in said wire are open due to the energization of contactor coil F and hence contactor coil R cannot now be energized.

The energization of coil F closed contacts F1, F2 and F3 in wires 55, 54 and 53, respectively, effecting forward energization of the motor 18, whereupon the work spindle commences rotation in the forward direction. The rotation of the work spindle drives shaft 35 and causes the movable contact arm 38 of the plugging switch 36 to swing over by centrifugal force into engagement with the forward contact F of said switch that is located in wire 69. Since relay FR in wire 62 is now energized normally open contacts FR—1 in wire 71 are closed and hence said wire is connected through the movable contact arm 38 of the plugging switch with wire 69 and thus relay RR in the latter wire is now energized and normally open contacts RR—1 in wire 72 are closed. At this time reverse coil R in wire 63 which is connected by wire 70 with wire 69 cannot be energized because the normally closed contacts F4 are held open by energized coil F.

The energization of relays FR and RR open normally closed contacts FR—2 and RR—2 in wire 73 and therefore at this time the wires 74, 75, 78, 79 and 80 are dead. The spindle is now rotating in the forward direction and it will be assumed that a machining operation is performed on the workpiece by suitably moving the turret slide in a feeding direction. During this rotation of the spindle the condenser C across wires 82, 83 will be charged to the full line voltage of the D. C. brake circuit. It will be assumed that the operator at the end of the machining operation returns the turret slide to its former position and desires to stop the spindle in a predetermined position to unload the finished workpiece and load a new workpiece in the chuck. He, therefore, turns control knob 77 to the "on" position, actuating the positioning switch 76 to close the contacts thereof in wire 74 and open the contacts thereof in wire 75 thus conditioning the positioning circuit for its subsequent function. At the end of the machining operation the operator swings lever 67 from the forward position to its intermediate "off" position thus opening the contacts of forward switch 65 in wire 61 and deenergizing forward contactor coil F causing the contacts F1, F2 and F3 in wires 55, 54 and 53 to open and deenergizing the motor 18. At the time of the deenergization of coil F normally closed contact F4 in wire 63 closes. The motor 18 and spindle 14 continue to rotate in a forward direction due to coasting and thus the movable contact arm 38 of the plugging switch remains in engagement with the forward contact F of said switch. Although the opening of the contacts of switch 65 deenergize relay FR causing contacts FR—1 in wire 71 to open the contacts RR—1 in wire 72 remain closed inasmuch as the circuit continued through the movable contact arm 38 of the plugging switch to relay RR and the latter remained energized. Since wire 63 is connected to wire 69 by wire 70 reverse contactor coil R in wire 63 is now energized, it being recalled that normally closed contacts F4 closed upon deenergization of coil F. Consequently the reverse contacts R1, R2 and R3 in wires 58, 57 and 56 are closed and the motor 18 is energized for reverse rotation.

This energization of the motor slows down its forward coasting rotation until its speed is such that the movable contact arm 38 of the plugging switch moves off of forward contact F of said switch, thus interrupting the circuit to wire 69 and causing relay RR and coil R to deenergize. The deenergization of relay RR causes normally closed contacts RR—2 in wire 73 to close, it being understood that normally closed contacts FR—2 in said wire previously closed upon deenergization of the relay FR in wire 62. At this time the circuit to wire 80 is completed through wires 74 and 73 and hence the solenoid 47 is energized, whereupon the bell crank lever on rod 40 is rocked to bring the roller 43 of the actuating arm 42 of limit switch LS1 into contact with the periphery of the cam 39. If the roller 43 initialy contacts the low portion of the cam the switch LS1 will not be actuated until the cam has rotated to bring the roller into contact with its high portion. On the other hand, if the roller 43 initially contacts the high portion of the cam the limit switch LS1 will be immediately actuated. The actuation of limit switch LS1 closes the normally open contacts of said switch in wire 79 and opens the normally closed contacts of said switch in wire 78. The closing of the contacts of limit switch LS1 in wire 79 causes relay CR in wire 74 to be energized thus closing contacts CR—1 in wire 74 to hold the relay energized and also closing contacts CR—2 in wire 78.

As soon as the roller 43 of the limit switch actuating arm bears on the low portion of the cam 39 the contacts of said limit switch in wire 79 open while the contacts thereof in wire 78 close, relay CR remaining energized since it is held in the circuit by now closed contacts CR—1 in wire 74. In the closing of the contacts of limit switch LS1 in wire 78 during the period that the roller 43 is in contact with the low portion of the cam completes the circuit through wire 78 to wire 75 to energize relay CR2. When the relay CR2 is energized contacts CR2—1 in wire 83 of the electromagnetic brake circuit are closed, whereupon the condenser C which has been charged to full line voltage that is substantially greater than the rated voltage capacity of the coil 28 applies an abnormally high voltage to said coil until the condenser has discharged. This application of the abnormally high voltage to the coil 28 of the brake causes said coil to exert an abnormally heavy magnetic pull on the armature plate 29 and to create an abnormally greater braking action to the rotation of the shaft 19 of the motor 18 and the work spindle. This abnormally greater braking action occurs immediately upon the energization of the coil 28 but lasts only that moment required to discharge the condenser C after which the resistor R applies the rated voltage to the coil and the latter functions to apply a normal braking action to the motor shaft 19, the work spindle driver and the work spindle. It will thus be seen that the work spindle will be stopped in a predetermined position within the limit of the arcuate low portion of the cam 39 as defined by the points A and B.

It will also be seen that until it is desired to stop the spindle in a predetermined position the roller 43 of the actuating arm 42 of limit switch LS1 will be held out of engagement with the cam due to the solenoid 47 being deenergized and the bell crank lever being rocked by gravity of the solenoid armature and the shaft in the proper direction. The spindle having been stopped in the predetermined position the electromagnetic brake will continue to be energized and to hold the spindle in said stopped position until the operator swings the lever 67 to either forward or reverse position to again energize the motor and one or the other of relays FR and RR to open one or the other of contacts FR—2 and RR—2 in wire 73.

The explanation heretofore set forth dealt with the operation of the motor in the forward direction. It will be understood that should it be desired to operate the motor in the reverse direction the lever 67 is moved to the reverse position to close the contacts of the reverse switch 66 in wire 63. This energizes contactor coil R in said wire and closes contacts R1, R2 and R3 in wires 58, 57 and 56 to energize the motor 18 for reverse rotation. At the same time relay RR in wire 69 is energized and normally open contacts RR—1 in wire 72 are closed. With the motor and spindle rotating in the reverse direction the movable contact arm 38 of the plugging switch 36 swings by centrifugal force into engagement with the reverse contact R of said switch that is located in wire 68 and hence the circuit is completed to relay FR in wire 62 but not to coil F in wire 61 since normally closed contact R4 in said wire is now open. When it is desired to stop the reverse rotation of the spindle the lever 67 is moved from the reverse position to its intermediate "off" position to open contacts of switch 66 in wire 63 and deenergize coil R to open contacts R1, R2 and R3 and deenergize the motor 18. However, due to the reverse coasting of the motor, the contact arm 38 of the plugging switch is still in contact with the reverse contact R in wire 68 and hence relay FR remains energized which maintains contacts FR—2 in wire 73 open. Also coil F is now energized since coil R has been deenergized and contacts R4 in wire 61 have closed. Therefore contacts F1, F2 and F3 are closed imparting forward energization to the motor 18. This forward energization of the motor decelerates the reverse coasting rotation of the motor shaft and work spindle and when the deceleration has reached a predetermined point the movable contact arm 38 will leave the reverse contact R of the plugging switch causing deenergization of coil F and relay FR, relay RR having previously been deenergized. Thereupon both normally closed contacts FR—2 and RR—2 in wire 73 close and the positioning circuit is energized and functions as previously explained.

Assuming that it is not desired to stop the spindle in the predetermined position then the operator sets the positioning control knob 77 in the "off" position which opens the contacts of switch 76 that are in wire 74 and closes the contacts thereof that are in wire 75. It will be seen that under this condition the instant the motor 18 is deenergized that relay CR2 will be energized to effect an application of the electromagnetic brake since contacts FR—2 and RR—2 in wire 73 will be closed completing the circuit through wires 73 and wire 75. In order words, the brake will be applied automatically every time that the motor 18 is deenergized.

If the spindle positioning switch is in the "on" position this application of the brake will function to stop the spindle rotation in a predetermined position while if the switch 76 is in the "off" position the application of the brake will stop the rotation of the spindle without regard to any particular position.

Although the motor shaft 19 and work spindle 14 have been shown as operatively connected by a belt and pulley drive, it will be understood that they might be connected by gearing or any other suitable change speed transmission. In such case the transmission as well as the motor and work spindle will be braked when the brake is applied.

A preferred embodiment of the invention has been illustrated and described herein but it will be understood that the invention is susceptible of various modifications and adaptations within the scope of the appended claims.

Having thus described my invention, I claim:

1. In a machine tool having a movable member, a reversible electric motor for driving said member, a control circuit for said motor including forward and reverse motor control switches and a plugging switch for decelerating said motor to a predetermined low speed when said control switches are open; and electrically controlled brake means for braking the movement of said member and motor; the improvement which consists in providing mechanism for stopping said member in a predetermined position and comprising a cam moving in timed relation with said member, a braking switch in said circuit for controlling said brake means, a movable support for said braking switch and normally positioned so that said braking switch is out of operative relationship with said cam, an electromotive device in said circuit for moving said support to position said braking switch in operative relationship with said cam, and means in said circuit for causing actuation of said electromotive device automatically when said motor has been decelerated by said plugging switch to operatively associate said braking switch and said cam to effect application of said brake means under the control of said cam to stop said member in a predetermined position.

2. The improvement as defined in claim 1 and wherein the said braking switch is a double contact switch having a normally open contact and a normally closed contact, while said cam is provided with a high portion and a low portion, said high portion of said cam acting when said braking switch is in operative relationship to said cam to actuate said braking switch to close the normally open contacts thereof and open the normally closed contacts thereof to condition the circuit preliminary to brake actuation, said low portion of the cam permitting said braking switch to assume its normal condition wherein the normally open contacts are open and the normally closed contacts are closed to effect brake actuation and to stop the movement of said member in correlation to the low portion of the cam.

3. The improvement as defined in claim 1 and wherein the brake means is an electromagnetic brake, the coil of which is in a direct current brake circuit, said brake circuit being provided with normally open relay actuated contacts, while said control circuit includes a relay for closing said normally open relay contacts, said relay when said positioning switch is actuated to render active the means in the circuit for causing actuation of the electromotive device being controlled by the said braking switch and when said positioning switch is actuated to render said means inactive said relay is controlled directly by said positioning switch.

4. The improvement as defined in claim 3 and wherein the direct current brake circuit has a voltage value substantially in excess of the rated voltage value of the brake coil while said circuit is provided with a resistance having a chosen value correlated to the rated voltage value of said coil and with a condenser located intermediate said resistance and said normally open relay actuated contacts and in parallel with said coil.

5. The improvement defined in claim 1 and wherein the said means in said circuit for causing actuation of said electromotive device includes a positioning switch actuatable to one position wherein said means is rendered inactive or to another position wherein said means is rendered active and wherein said positioning switch when actuated to render said means inactive and while said braking switch is out of operative relationship to said cam conditions said control circuit to apply said brake means upon deceleration of the motor by said plugging switch.

IRVING F. WEISS.

REFERENCES CITED

The following references are of record in the file of this patent:

UNITED STATES PATENTS

| Number | Name | Date |
|---|---|---|
| Re. 22,324 | Newman | May 25, 1943 |
| 1,844,640 | Cutler | Feb. 9, 1932 |
| 2,005,663 | Phily | June 18, 1935 |
| 2,155,681 | Price | Apr. 25, 1939 |
| 2,279,722 | Taylor | Apr. 14, 1942 |
| 2,285,517 | Harvey et al. | June 9, 1942 |
| 2,406,782 | Lewis | Sept. 3, 1946 |